United States Patent
Hruska

(10) Patent No.: US 8,094,613 B2
(45) Date of Patent: Jan. 10, 2012

(54) ENHANCED HIGH TRAFFIC DENSITY CDMA WIRELESS SYSTEMS

(75) Inventor: George Jay Hruska, Naperville, IL (US)

(73) Assignee: Alcatel Lucent, Paris (FR)

( * ) Notice: Subject to any disclaimer, the term of this patent is extended or adjusted under 35 U.S.C. 154(b) by 3364 days.

(21) Appl. No.: 10/253,092

(22) Filed: Sep. 24, 2002

(65) Prior Publication Data

US 2004/0057406 A1    Mar. 25, 2004

(51) Int. Cl.
*H04W 4/00* (2009.01)
*H04B 7/00* (2006.01)
*H04L 12/42* (2006.01)

(52) U.S. Cl. .................. 370/329; 370/310.2; 370/338; 455/453

(58) Field of Classification Search .................. None
See application file for complete search history.

(56) References Cited

U.S. PATENT DOCUMENTS

| | | | |
|---|---|---|---|
| 5,519,691 A * | 5/1996 | Darcie et al. | 370/331 |
| 6,792,276 B1 * | 9/2004 | Butovitsch et al. | 455/453 |
| 2004/0203832 A1 * | 10/2004 | An | 455/453 |

* cited by examiner

*Primary Examiner* — Warner Wong
(74) *Attorney, Agent, or Firm* — Werner Ulrich, Esq.

(57) ABSTRACT

A method of assigning calls to a hot cell site. A hot cell site is a cell site for carrying highly concentrated traffic, which cell site supports only a proper sub-set of the frequencies supported by other (basic) cells. It is surrounded by hot zones of other (basic) cell sites. When mobile stations enter the hot zone, an extra percentage of powered-on, but idle mobile stations is tuned or re-tuned to one of the frequencies supported by the hot cell. Advantageously, this increases the traffic carried by the hot cell. In accordance with one feature of the invention, if a hot cell is approaching the limit of its call carrying capacity, it will hand-off calls to a neighboring cell. Advantageously, the hot cell usage is optimized.

8 Claims, 4 Drawing Sheets

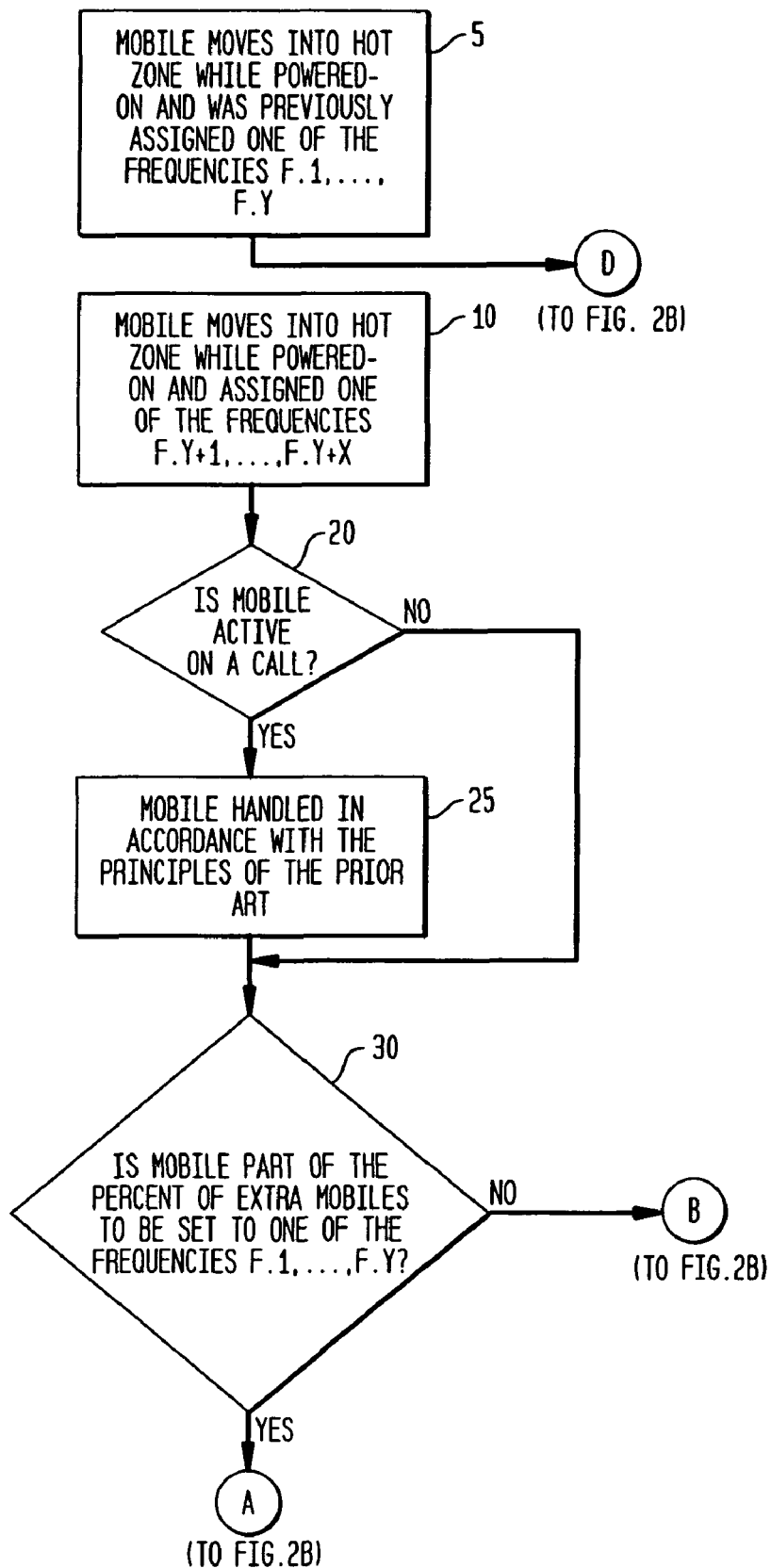

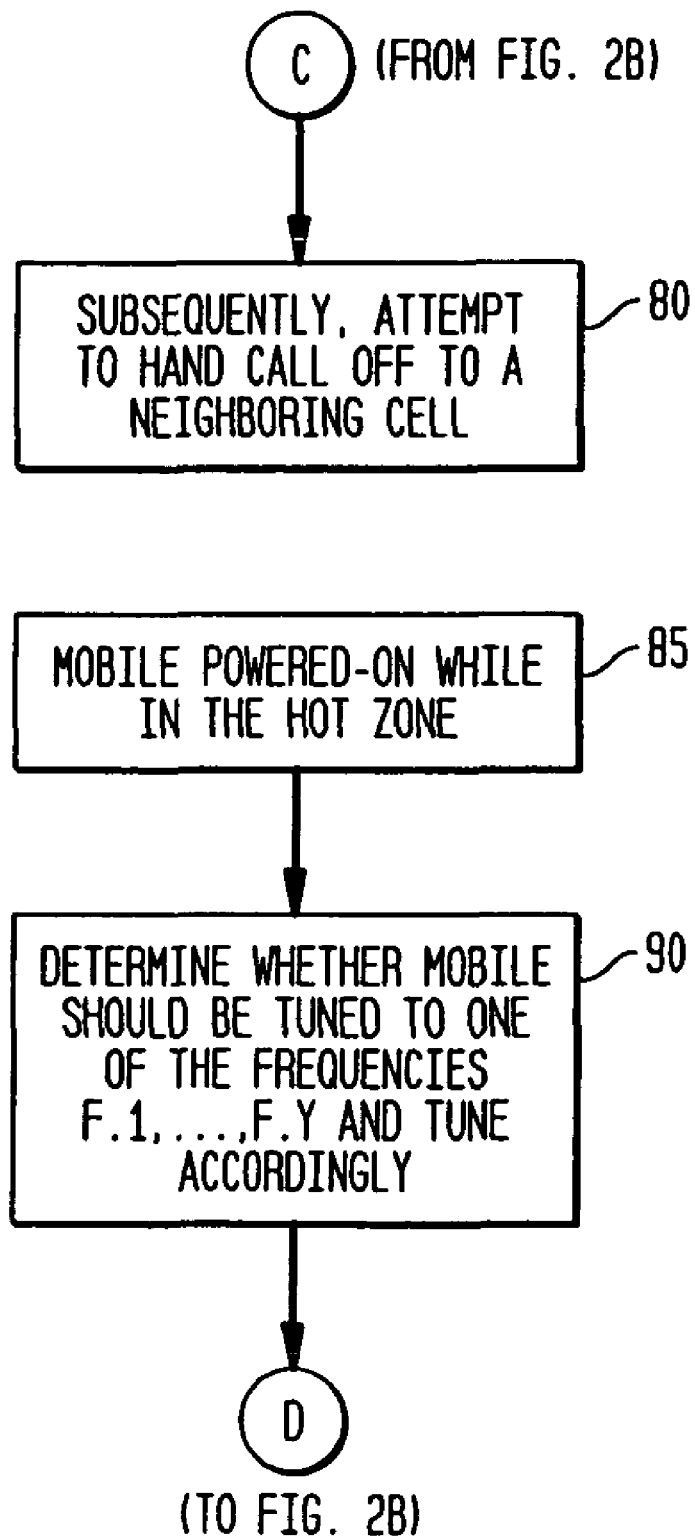

ENHANCED HIGH TRAFFIC DENSITY CDMA WIRELESS SYSTEMS

TECHNICAL FIELD

Figure 1:
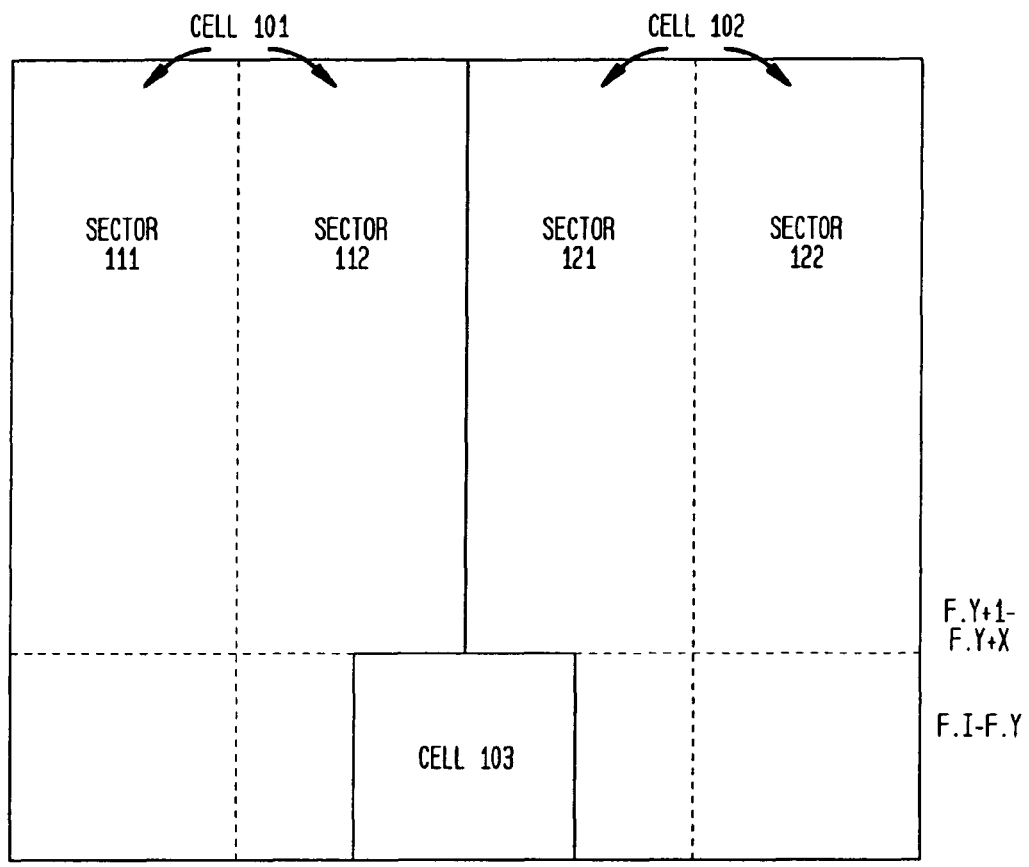

This invention relates to arrangements for improving the traffic capacity in high traffic density CDMA wireless systems.

PROBLEM

Wireless systems in general frequently have "hot spots", where the traffic density is very high. A example would be the area immediately surrounding one or more high rise business locations. For wireless systems handling Code Division Multiplex Access (CDMA) transmission, this situation is usually handled by adding one or more large, high capacity cells or by adding one or more smaller, lower capacity cells, (hot cells). A problem of the prior art is that large high capacity cells are expensive and provide more relief than is required, while the hot cells do not provide adequate relief because they are used inefficiently.

SOLUTION

Applicant has carefully studied the present arrangements. When a hot cell is added to an existing group of CDMA cell sites, the hot cell is normally assigned a set of frequencies, which is a sub-set of the frequencies of the basic cell sites that surround the hot cell area. The hot cell will carry only the traffic of idle mobile stations, originally assigned to one of the sub-set frequencies, that moves into the area under the control of the hot cell, or mobile stations that are powered-on when they are in the area of the hot cell, and are assigned one of the sub-set frequencies. Applicant has invented an arrangement for utilizing the hot cell more effectively, and has added to the teachings of the prior art in accordance with this invention, wherein of the idle but powered-on mobiles crossing a hot border, i.e., to an area adjacent to, and overlapping with the coverage area of a hot cell, an extra percentage are reassigned to one of the sub-set frequencies served by the hot cell; then whenever a mobile tuned to one of the sub-set frequencies enters the coverage area of the hot cell, and becomes active on a call, that call will be handled by the hot cell. If the hot cell is nearing its call carrying limit, then the hot cell will attempt to hand-off the call to a neighboring cell on one of the frequencies outside the sub-set. Advantageously, by assigning a larger fraction of mobiles to the sub-set of frequencies supported by the hot cell, more traffic is relieved from the basic cells.

BRIEF DESCRIPTION OF THE DRAWING(S)

Figure 2B:
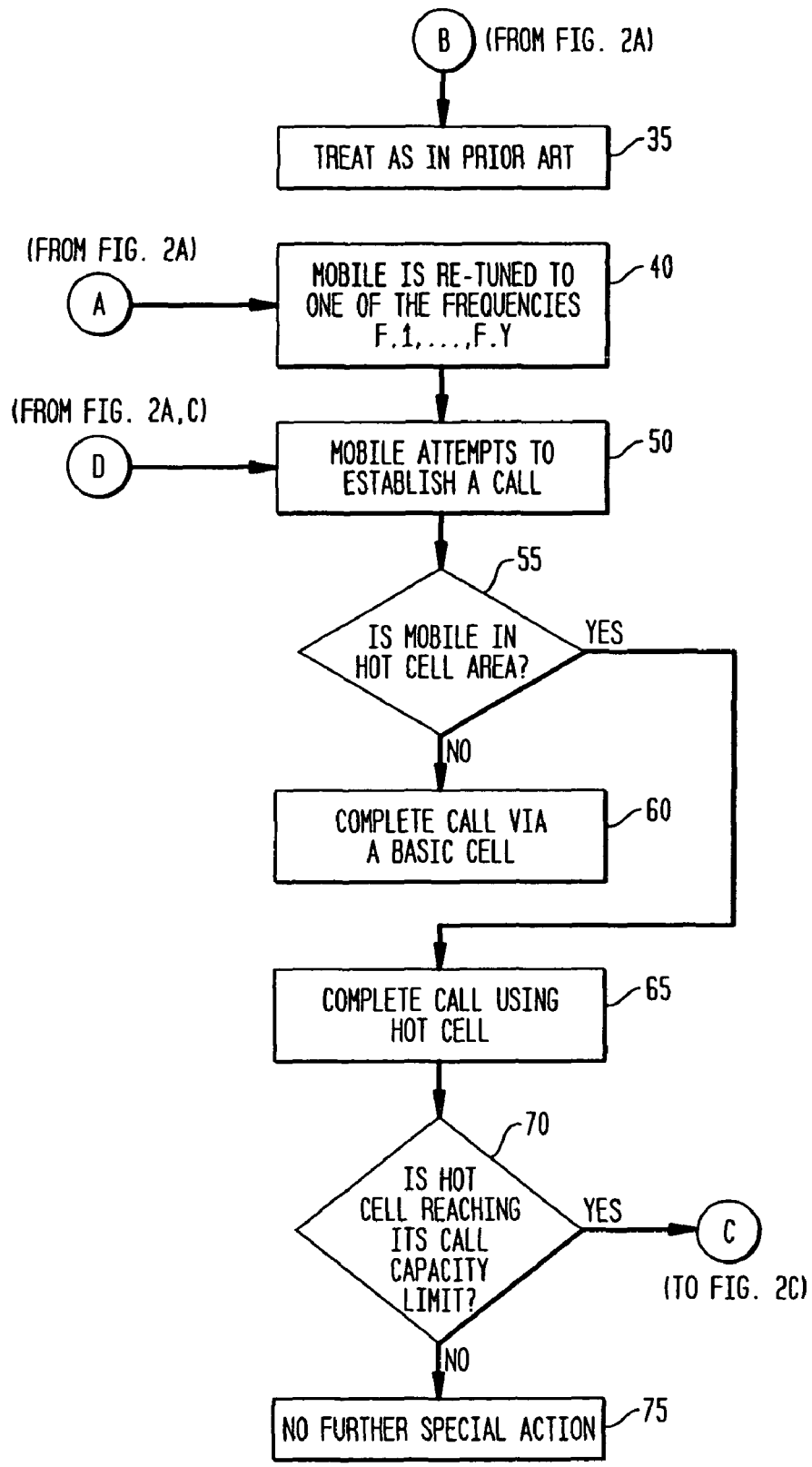

FIG. 1 illustrates the relationship among hot cells, hot zones, and the frequencies supported by these units; and FIG. 2 is a flow diagram illustrating the operation of Applicant's invention.

DETAILED DESCRIPTION

FIG. 1 illustrates the relationship among hot cells, hot borders, and basic cells. Cells (101) and (102) are basic cells having a full complement of frequencies. Cell (103) is a hot cell inserted into an area of high wireless demand to provide capacity relief. In accordance with Applicant's invention, the hot cell has knowledge of its neighbor cells, including the number of carrier frequencies available in each. Cells (101) and (102) are illustratively divided into sectors (111) and (112), and (121), (122), respectively. The sectors (112) and (121), closest to, and in fact, including the coverage area of hot cell (103) are hot border sectors. In accordance with the teachings of Applicant's invention, an attempt is made to introduce more traffic into cell (103) than would be possible if cells (101) and (102) simply distributed their traffic uniformly across all of their frequencies. In this example, cell (103) supports frequencies F.1, . . . F.Y, and cells (101) and (102) support frequencies F.1, . . . , F.Y+X.

FIG. 2 illustrates the operation of Applicant's invention. A mobile station moves into a hot zone, Action Block (10). The example mobile that moves into the hot zone has been tuned to one of the frequencies F.Y+1, . . . , F.Y+X. The tuning is performed in response to a message received over a pilot channel defining the available frequencies; the selection among these frequencies is based on a deterministic algorithm known in the prior art. The example mobile is not tuned to a frequency supported by the hot cell. Test (20) determines whether the mobile is active on a call. If so, the mobile is handled in accordance with the principles of the prior art, Action Block (25). (Unless a hand-off is required, due to fewer available frequencies in an adjoining cell, it is not desirable to change the frequency of a mobile unit that is active on a call). If the mobile is not active on a call, then test (30) is used to determine if the mobile is one of a percentage of mobiles to be re-tuned to one of the frequencies F.1, . . . , F.Y, that are supported by the hot cell. If the mobile is not one of the percentage, then the mobile is handled as in the prior art, Action Block (35). If the mobile is part of the percentage to be sent to one of the common frequencies, then the mobile is assigned one of the frequencies F.1, . . . , F.Y, where Y is defined as the number of frequencies available in the hot cell, Action Block (40). The mobile is re-tuned using a message not in the Standards, but one which can be implemented in a straightforward manner. These tests are performed under the control of a controller of the cell site serving the mobile unit. Subsequently, the mobile moves to the coverage area of the hot cell, i.e., to an area wherein the signal strength from the hot cell exceeds the signal strength of other cells, and attempts to establish a call on a traffic channel, Action Block (50). Test (55) determines whether the mobile is in the hot cell area. If not, the call is completed via one of the basic cells, as in the prior art, Action Block (60). If the mobile is in the hot cell area, the call is completed in the hot cell (65). In accordance with the principles of this Application, a new test, Test (70), is used to determine whether Cell (103), (the hot cell), is reaching its call capacity limit. If not, no further special action is required, Action Block (75). If the hot cell is reaching its call capacity limit, then after the call is established, an attempt is made to hand the call off to a neighboring cell on a carrier frequency outside the sub-set supported by the hot cell, which are available on those cells, Action Block (80). The tests and actions of this sequence chart are controlled by a controller of the cell site serving the mobile unit.

If the mobile has originally entered the hot zone while tuned to one of the frequencies F.1, . . . , F.Y, Action Block (5), then when the mobile originates, Action Block (50) is immediately entered.

If the mobile is powered-on while in the hot zone, Action Block (85), the control system determines whether the mobile should be tuned to one of the frequencies F.1, . . . , F.Y, and tunes the mobile accordingly, Action block (90). Subsequent attempts by the mobile to originate are processed according to Action Block (50).

FIG. 2 shows all the calls which are associated with powered-on mobiles entering the hot zone or powering-on while in the hot zone. The object is to move extra calls onto the hot cell, and, in accordance with Action Block (80), to relieve the hot cell of excessive traffic if necessary. Advantageously, this arrangement allows the hot cell to carry more traffic up to the limit of its traffic carrying capacity, something which is not accomplished in the prior art.

The above description is of one preferred method of implementing Applicant's invention. Other methods will be apparent to those of ordinary skill in the art, without departing from the principles of Applicant's invention. The invention is only limited by the attached Claims.

I claim:

1. In a Code Division Multiplex Access (CDMA) cellular wireless telecommunication system, a method of assigning calls to a hot cell comprising the steps of:
    assigning to said hot cell, a first sub-set of carrier frequencies;
    assigning to cells or sectors in a hot zone surrounding said hot cell, a plurality of bands of frequencies, the assigned frequencies of each of the hot zone cells or sectors including said first sub-set as a proper sub-set;
    assigning a base percentage of calls in a hot zone to said first subset of carrier frequencies;
    tuning more than said base percentage of powered-on idle mobile stations in said hot zone to said first subset of carrier frequencies;
    retaining a tuned frequency when a powered-on idle mobile in said hot zone becomes active on a call;
    whereby a larger percentage of calls will be served by frequencies of said hot cell.

2. The method of claim 1, wherein the step of tuning more than said base percentage comprises the step of
    retuning more than said base percentage of powered-on idle mobile stations to said sub-set of frequencies when they enter said hot zone.

3. The method of claim 1, wherein the step of tuning more than said base percentage comprises the step of:
    tuning more than said base percentage of idle mobile stations to said sub-set of frequencies when they power-on in said hot zone.

4. The system of claim 1, further comprising the step of:
    detecting that said hot cell is reaching its capacity limit;
    responsive to said detecting, attempting to hand-off a call from said hot cell to a neighboring cell on a carrier frequency outside said sub-set.

5. A Code Division Multiplex Access (CDMA) cellular wireless telecommunication system, comprising:
    a hot cell to which is assigned a first sub-set of carrier frequencies;
    cells or sectors in a hot zone surrounding said hot cell having a plurality of bands of frequencies, the assigned frequencies of each of the hot zone cells or sectors including said first sub-set as a proper sub-set;
    means for assigning a base percentage of calls in a hot zone to said first subset of carrier frequencies;
    means for tuning more than said base percentage of idle powered-on mobile stations in said hot zone said first sub-set of frequencies;
    means for retaining a tuned frequency when a powered-on mobile in said hot zone becomes active on a call;
    whereby a larger percentage of cells calls will be served by frequencies of said hot cell.

6. The system of claim 5, further comprising means for:
    retuning more than said base percentage of powered-on idle mobile stations to said sub-set of frequencies when they enter said hot zone.

7. The method of claim 5, wherein said means for tuning more than said base percentage of idle powered-on mobile stations in said hot zone to said first subset of frequencies comprises;
    means for tuning a higher percentage of idle mobile stations to said sub-set of frequencies when they power-on in said hot zone.

8. The system of claim 5, further comprising:
    means for detecting that said hot cell is reaching its capacity limit; and
    means responsive to said detecting, for attempting to hand-off a call from said hot cell to a neighboring cell on a carrier frequency outside said sub-set.

* * * * *